United States Patent
Aithal et al.

(10) Patent No.: US 11,755,261 B2
(45) Date of Patent: Sep. 12, 2023

(54) METHOD AND DEVICE FOR PRINTING VARIABLE COPIES OF A PLURALITY OF PAGES IN A DOCUMENT

(71) Applicant: TOSHIBA TEC KABUSHIKI KAISHA, Tokyo (JP)

(72) Inventors: Roshini Aithal, Karnataka (IN); Pradeepa Siddappa, Karnataka (IN)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/691,827

(22) Filed: Mar. 10, 2022

(65) Prior Publication Data

US 2022/0405024 A1   Dec. 22, 2022

(30) Foreign Application Priority Data

Jun. 21, 2021   (IN) .............................. 202141027794

(51) Int. Cl.
*G06F 3/12* (2006.01)

(52) U.S. Cl.
CPC .......... *G06F 3/1205* (2013.01); *G06F 3/1204* (2013.01); *G06F 3/1258* (2013.01); *G06F 3/1267* (2013.01); *G06F 3/1276* (2013.01)

(58) Field of Classification Search
CPC combination set(s) only.
See application file for complete search history.

(56) References Cited

U.S. PATENT DOCUMENTS

| | | | |
|---|---|---|---|
| 6,320,678 B1 | 11/2001 | Kim | |
| 8,913,263 B2 | 12/2014 | Kadiyala et al. | |
| 10,095,446 B2 * | 10/2018 | Kaneko | G06F 3/1285 |
| 2005/0015524 A1 * | 1/2005 | Yamada | G06F 3/0237 |
| | | | 710/62 |
| 2007/0103714 A1 | 5/2007 | Ushiku | |
| 2007/0165248 A1 * | 7/2007 | Utsunomiya | G06F 3/1208 |
| | | | 358/1.1 |
| 2010/0199175 A1 * | 8/2010 | Yajima | G06F 3/1285 |
| | | | 715/255 |

(Continued)

FOREIGN PATENT DOCUMENTS

KR   10-2006-0048464 A   5/2006

OTHER PUBLICATIONS

Extended European Search Report dated Aug. 18, 2022 issued in EP Application No. 22162280.6, 8 pages.

*Primary Examiner* — Helen Zong
(74) *Attorney, Agent, or Firm* — FOLEY & LARDNER LLP

(57) ABSTRACT

Disclosed herein is a method and a printer driver unit for printing variable copies of a plurality of pages in a document. In an embodiment, a user input comprising a number of copies of the plurality of pages to be printed is received from a user. Further, the user input is parsed to determine the plurality of pages to be printed and the number of copies that each of the plurality of pages to be printed. Thereafter, the content of each of the plurality of pages is retrieved from a temporary file or a memory associated with the printer driver unit and printed with the help of a printer device. Accordingly, the present disclosure allows users to print variable copies of plurality of pages on a single print action, and thereby enhances speed of printing and ensures optimal usage of resources.

14 Claims, 6 Drawing Sheets

(56) References Cited

U.S. PATENT DOCUMENTS

| | | | |
|---|---|---|---|
| 2019/0087142 A1* | 3/2019 | Pinney | G06F 3/1248 |
| 2020/0023237 A1* | 1/2020 | Yamada | G01S 19/43 |
| 2021/0176374 A1 | 6/2021 | Doi | |
| 2021/0218864 A1* | 7/2021 | Kunimatsu | H04N 1/2338 |
| 2022/0394139 A1* | 12/2022 | Kaneda | H04N 1/00474 |

* cited by examiner

METHOD AND DEVICE FOR PRINTING VARIABLE COPIES OF A PLURALITY OF PAGES IN A DOCUMENT

CROSS-REFERENCE TO RELATED APPLICATION

This application is based upon and claims the benefit of priority from Indian Patent Application No. 2021-41027794, filed Jun. 21, 2021, the entire contents of which are incorporated herein by reference.

TECHNICAL FIELD

The present subject matter is, in general, related to Multi-Function Printers (MFPs), but not exclusively, to a method and device for printing variable copies of a plurality of pages in a document.

BACKGROUND

A printer is an output device that accepts text and graphic information from a computer and transfers this information to a physical paper. In general, the printer is associated with a printing application that allows the printer to receive the information to be printed from the computer. While printing the information using any printing application, a User Interface (UI) associated with the printer allows users to input or select various print options like printer selection, page selection, page orientation etc.

Further, when the user has to print multiple copies of multiple pages from a document, the print UI provides an option to select pages or a range of pages and the number of copies of the selected pages. However, in the existing print mechanisms, the number of copies entered by the user will be applied for all the pages selected by the user. For example, if the user selects the pages 1-4, 6, 8 and enters the number of copies required as '3', then 3 copies of all the pages 1, 2, 3, 4, 6, and 8 will be printed. In other words, the existing print mechanisms do not provide an option to print different number of copies of different set of pages in a single print action. For example, the existing print mechanisms do not provide an option to print 3 copies of pages 1-4, 2 copies of page 6, and 5 copies of page 8. Therefore, to achieve this, the user needs to perform three separate print actions. That is, for the above example, the user has to issue following three print commands—1) print 3 copies of pages 1-4; 2) print 2 copies of page 6; and 3) print 5 copies of page 8. Thus, the existing print mechanisms consume more time and resources for printing variable copies of multiple pages. This poses a serious limitation when the number of pages to be printed is large.

Therefore, it would be advantageous to have a print mechanism that allows users to print different number of copies of different pages in a single print action.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a method for printing variable copies of a plurality of pages in a document. The method comprises receiving, by a printer driver unit, a user input comprising a number of copies of the plurality of pages to be printed. Further, the method comprises parsing the user input to determine the plurality of pages to be printed and the number of copies each of the plurality of pages to be printed. After determining the plurality of pages and the number of copies, the method comprises retrieving, by the printer driver unit, content of each of the plurality of pages determined. Thereafter, the method comprises printing the determined number of copies of the retrieved content.

Further, the present disclosure relates to a printer driver unit for printing variable copies of a plurality of pages in a document. The printer driver unit is associated with a processor and a memory, communicatively coupled to the processor. The memory stores processor-executable instructions, which on execution, cause the processor to receive a user input comprising a number of copies of the plurality of pages to be printed. Further, the instructions cause the processor to parse the user input to determine the plurality of pages to be printed and the number of copies each of the plurality of pages to be printed. Thereafter, the instructions cause the processor to retrieve content of each of the plurality of pages determined. Finally, the instructions cause the processor to print the determined number of copies of the retrieved content.

The foregoing summary is illustrative only and is not intended to be in any way limiting. In addition to the illustrative aspects, embodiments, and features described above, further aspects, embodiments, and features will become apparent by reference to the drawings and the following detailed description.

DESCRIPTION OF THE DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
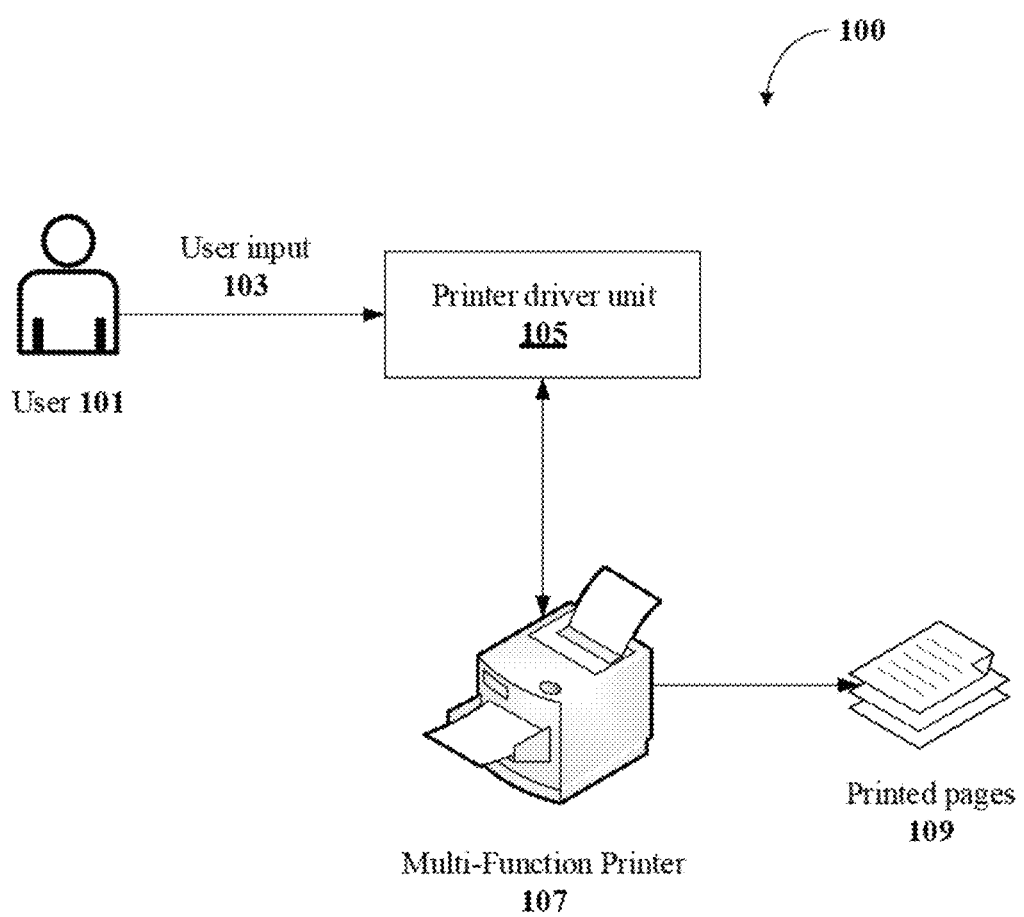
FIG. 1 shows an exemplary environment for printing variable copies of a plurality of pages of a document in accordance with some embodiments of the present disclosure.

It should be appreciated by those skilled in the art that any block diagrams herein represent conceptual views of illustrative systems embodying the principles of the present subject matter.

Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a printer driver unit for printing variable copies of a plurality of pages in a document. In an embodiment, the method of present disclosure provides an option for the users to input different number of copies of different pages for printing. That is, according to the present disclosure, the user is allowed to input a 'string' that specifies pages and corresponding number of copies to be printed. For example, to print three copies of pages 1-4, 2 copies of page 6, and 5 copies of page 8, the user shall input the string—1-4*3, 6*2, 8*5.

Thus, the present disclosure allows the user to get the desired number of copies of each page in a single print action, without the need to issue three print commands separately.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment 100 for printing variable copies of a plurality of pages of a document in accordance with some embodiments of the present disclosure.

In an embodiment, the environment 100 may include, without limiting to, a user 101, a printer driver unit 105, and a Multi-Function Printer (MFP) 107. In an embodiment, the user 101 may be an operator of the MFP 107. In an embodiment, the printer driver unit 105 may be a computing unit (such as a computer, server, programmed processor) configured with a printer driver application, which is capable of scanning through a document and converting content/data to be printed into a format that is understandable by the MFP 107. In an implementation, the printer driver unit 105 may be a standalone computing unit that may be connected to the MFP 107 as an external plugin. Alternatively, the printer driver unit 105 may be configured within the MFP 107. In an implementation, the printer driver unit 105 may be associated with a User Interface (UI) for receiving a user input 103 from the user 101. As an example, the UI may include, without limiting to, a display screen, a touchscreen, a touchpad, a keypad, and the like. In an embodiment, when the printer driver unit 105 is configured within the MFP 107, the printer driver unit 105 may use the UI of the MFP 107 for receiving the user input 103 from the user 101.

In an embodiment, the user input 103 may include a string of numerals that indicates the plurality of pages to be printed from a document and the number of copies that each of the plurality of pages need to be printed.

In an embodiment, the MFP 107 may be a machine designed to perform multiple functionalities including, without limiting to, scanning a document, photocopying a document, printing a document, and the like. For various embodiments of the present disclosure, the print functionality of the MFP 107 may be considered.

In an embodiment, after receiving the user input 103 from the user 101, the printer driver unit 105 may process and/or parse the user input 103 to identify the pages to be printed and the number of copies that each of the pages need to be printed. For example, if the user 101 enters a user input 103 such as "1*4, 5-7*3", then the printer driver unit 105 may process the user input 103 and identify that the user 101 has selected pages 1 and 5-7 for printing. Additionally, the printer driver unit 105 may identify that the user 101 intends to print 4 copies of page 1 and 3 copies of page 5-7.

In an embodiment, after completely parsing the user input 103, the printer driver unit 105 may pass the parsed information to the MFP 107. Subsequently, the MFP 107 may print the required number of copies of selected pages onto physical papers (indicated as printed pages 109). Various processes involved in parsing the user input 103 and printing the variable copies of the selected pages are explained with reference to FIGS. 2A and 2B in the following paragraphs.

Figure 2A:
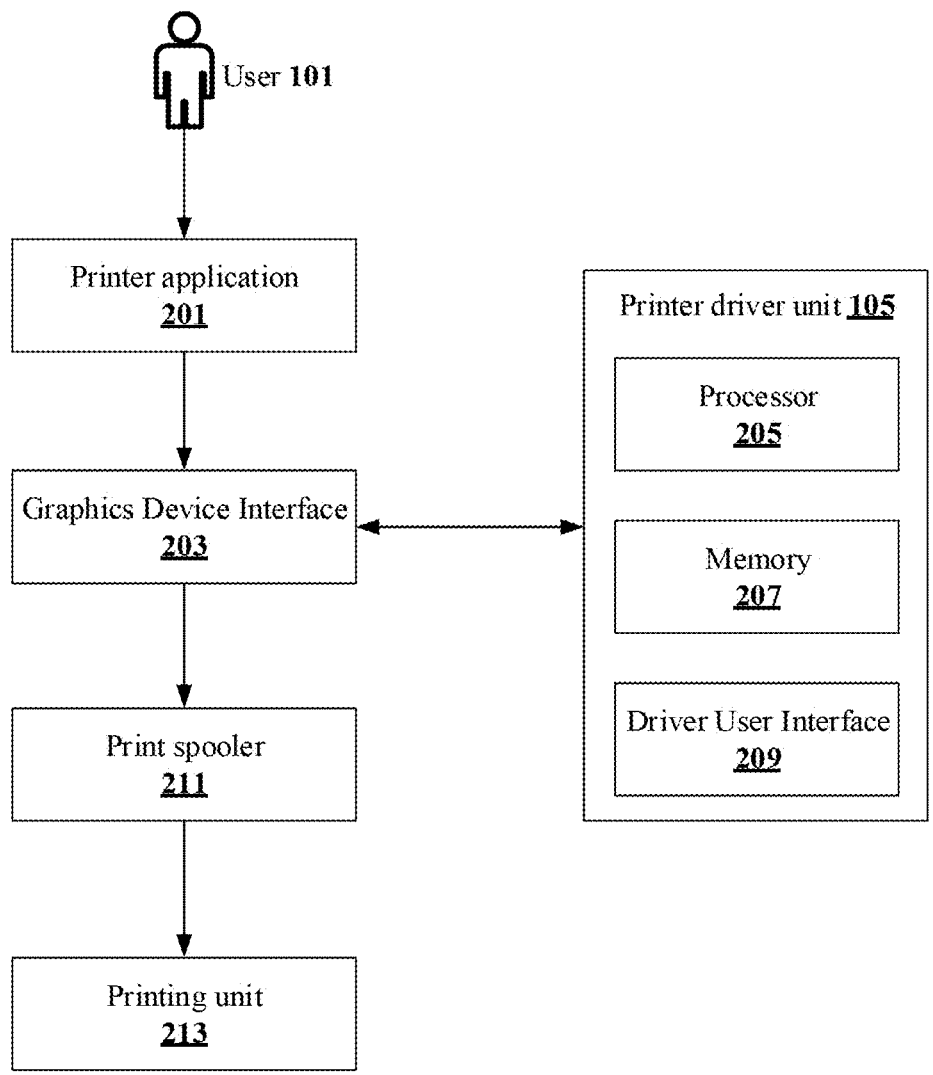
FIG. 2A shows an exemplary architecture of various components involved in a printing process in accordance with some embodiments of the present disclosure.

FIG. 2A shows an exemplary architecture of various components involved in a printing process in accordance with some embodiments of the present disclosure.

In an embodiment, as shown in FIG. 2A, the user 101 may use a printer application 201 for initiating printing of a document. The printer application 201 may be a utility that allows the user 101 to perform actions such as, without limiting to, submitting a document for printing, selecting a printer for printing the document, etc. In an implementation, the printer application 201 may be installed on an external computing system used by the user 101, using which the user 101 may select the MFP 107 for printing the required pages of the document.

In an embodiment, after receiving the above information from the user 101, the printer application 201 may invoke a Graphics Device Interface (GDI) 203. The GDI 203 may be an Application Programming Interface (API), as well as a core operating system associated with the MFP 107. The GDI 203 may be responsible for representing graphical objects/contents from the document to be printed and transmit this information to a printing unit 213 of the MFP 107.

In an implementation, the GDI 203 may be operatively interfaced with the printer driver unit 105. In an embodiment, after the user 101 initiates the printing through the printer application 201, the printer driver unit 105 may prompt the user 101 to enter the user input 103 through a Driver User Interface (Driver UI) 209 associated with the printer driver unit 105. At this stage, the user 101 may enter the user input 103 for selecting a plurality of pages to be printed from the document, along with an indication of number of copies that each of the plurality of pages need to be printed. Subsequently, the printer driver unit 105 may parse the user input 103 and transmit the information related to the pages selected and the number of copies to the GDI 203.

After identifying the pages to be printed and number of copies of each page to be printed, the GDI 203 may pass the content to be printed to a client side print spooler 211. The print spooler 211 may copy the content from the GDI 203 and pass it on to the printing unit 213. Thereafter, the printing unit 213 may print the content onto the physical papers according to the pages and the number of copies of each page selected by the user 101.

Figure 3A:
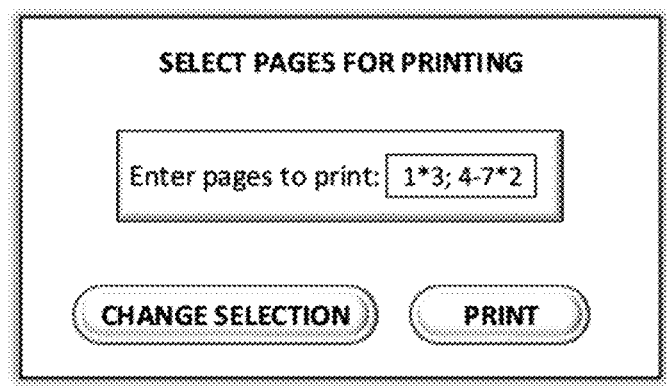
FIGS. 3A-3C provide exemplary illustration of a User Interface (UI) used for receiving user input in accordance with some embodiments of the present disclosure.

In an embodiment, the printer driver unit 105 may process the user input 103 and pass the selected pages for printing using one of the following two approaches:

Approach 1: Printer driver unit renders each page's data multiple times:

According to this approach, the printer driver unit 105 may be updated such that, the driver UI 209 provides an option to the user 101 to enter the page selection, for example, as shown in FIG. 3A. Thereafter, the printer driver unit 105 may parse the input string to identify the pages to be print and the number of copies of each page. Here, a predetermined constraint would be that the user 101 submits 'all pages' of the document for printing in the printer application 201. Accordingly, for each page selected by the user 101, the printer driver unit 105 shall capture the content of the selected page and store it in a temporary file 217. Contents of all the other pages, not selected by the user 101, may be skipped. Once the contents of all the selected pages are copied to the temporary file 217, the printer driver unit 105 may read each page's content from the temporary file 217 and send it to the printing unit 213 (through the print spooler 211) as many times as selected by the user 101. That is, if the user 101 needs 'three' copies of a particular page, then the printer driver unit 105 may send the content of that page to the printing unit 213 'three' times.

Approach 2: Using a Printer Job Language (PJL) command to handle multiple copies:

According to this approach, certain changes may be made in the printer driver unit 105 and as well as the printing unit 213 (or the MFP 107). In the existing scenario, the PJL command corresponding to selection of number of copies applies to all the pages in the document. Therefore, a new PJL command format may be identified, which helps in selecting different copies of different pages for printing. Also, the printing unit 213 or the MFP 107 may be modified to understand the new PJL command. Accordingly, in this scenario, instead of sending the contents multiple times, the printer driver unit 105 may directly send the new PJL command, indicating the selected pages and the number copies of each selected page, to the printing unit 213. Thereafter, the printing unit 213 may interpret the PJL command issued by the printer driver unit 105 and print the specified number of copies of each page selected by the user 101.

In an embodiment, a predetermined condition for both of these approaches is that the printer application 201 needs to send the whole document (i.e., all the pages of the document) to the GDI 203. Since the page selections done by the user 101 in the UI of the printer application 201 are not communicated to the printer driver unit 105, the user 101 needs to select 'all pages' in the printer application 201 UI, so that the content of the entire document could be fetched by the printer driver unit 105, for subsequently rendering the content as required by the user 101.

Figure 2B:
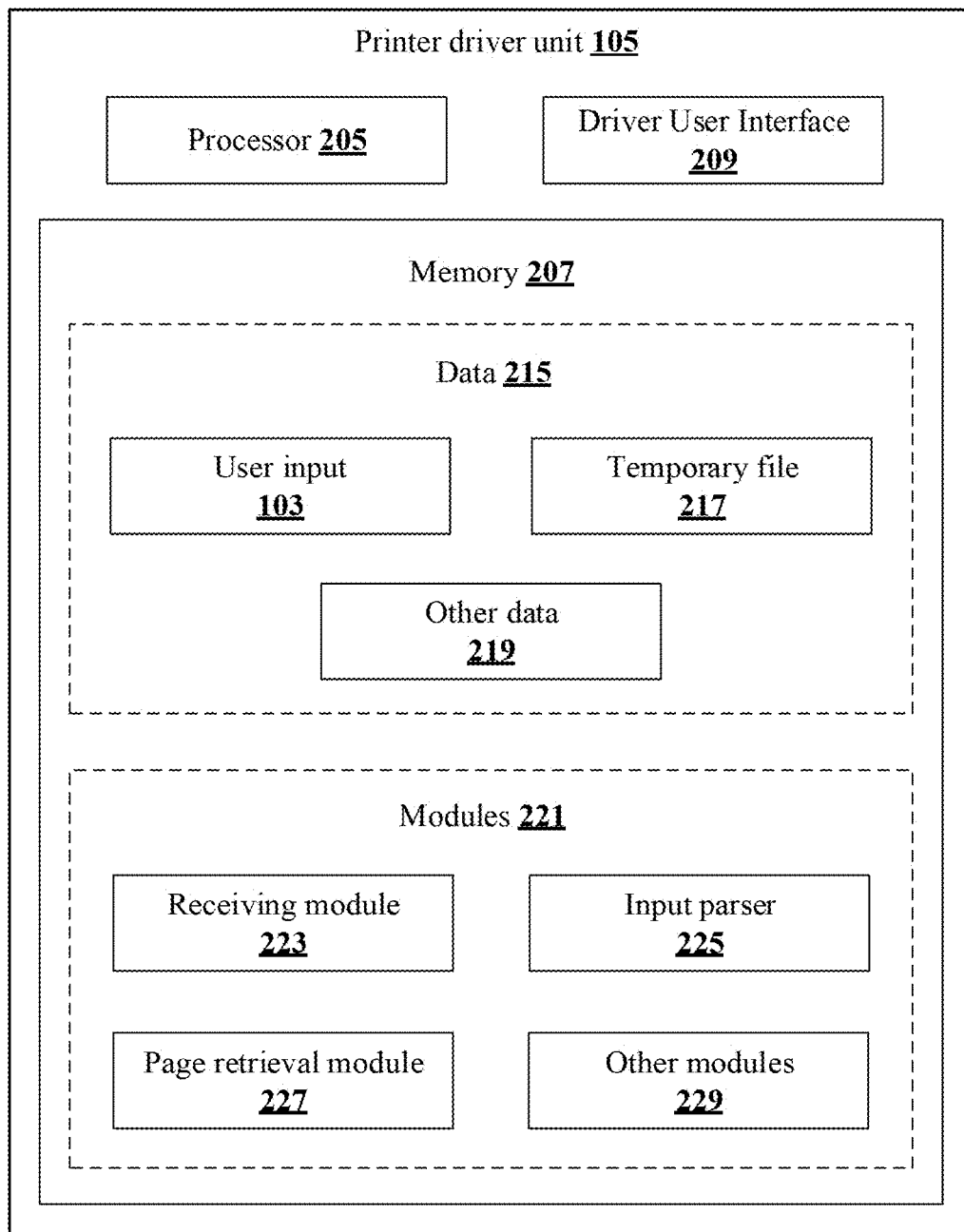
FIG. 2B shows a detailed block diagram of a printer driver unit in accordance with some embodiments of the present disclosure.

FIG. 2B shows a detailed block diagram of a printer driver unit 105 in accordance with some embodiments of the present disclosure.

In some implementations, the printer driver unit 105 may include a processor 205, a memory 207 and a Driver User Interface (UI) 209. In an embodiment, the processor 205 may be configured to perform one or more functions of the printer driver unit 105 for printing variable copies of a plurality of pages in a document, using the data 215 and the one or more modules 221 associated with the printer driver unit 105. The memory 207 may be communicatively coupled to the processor 205 and may store the data 215 and the one or more modules 221. The driver UI 209 may be used for receiving a user input 103 from the user 101.

In an embodiment, the data 215 stored in the memory 207 may include, without limitation, the user input 103 received from the user 101, a temporary file 217 and other data 219. In some implementations, the data 215 may be stored within the memory 207 in the form of various data structures. Additionally, the data 215 may be organized using data models, such as relational or hierarchical data models. The other data 219 may include various temporary data and files generated by the one or more modules 221 while performing various functions of the printer driver unit 105. As an example, the other data 219 may include, without limitation, temporarily stored user input 103 and buffer information generated while printing the document.

In an embodiment, the user input 103 may be a numeric string entered by the user 101. The user input 103 indicates the pages selected by the user 101 for printing and the number of copies of each selected page. The user input 103 may be received through a driver UI 209 associated with the printer driver unit 105.

In an embodiment, the temporary file 217 may be used for temporarily storing contents/data of the pages selected by the user 101 for printing. The temporary file 217 may be managed by the printer driver unit 105 where the printer driver unit 105 uses the temporary file 217 as a buffer memory to store the contents of the selected pages before passing it to the print spooler 211 or the printing unit 213.

In an embodiment, the data 215 may be processed by the one or more modules 221 of the printer driver unit 105. In some implementations, the one or more modules 221 may be a hardware unit communicatively coupled to the processor 205 for performing one or more functions of the printer driver unit 105. In an implementation, the one or more modules 221 may include, without limiting to, a receiving module 223, an input parser 225, a page retrieval module 227 and other modules 229.

As used herein, the term module may refer to an Application Specific Integrated Circuit (ASIC), an electronic circuit, a hardware processor (shared, dedicated, or group) and memory that execute one or more software or firmware programs, a combinational logic circuit, and/or other suitable components that provide the described functionality. In an implementation, each of the one or more modules 221 may be configured as stand-alone hardware computing units. In an embodiment, the other modules 229 may be used to perform various miscellaneous functionalities of the printer driver unit 105. It will be appreciated that such one or more modules 221 may be represented as a single module or a combination of different modules.

In an embodiment, the receiving module 223 may be configured for receiving the user input 103 from the user 101 through the driver UI 209 associated with the printer driver unit 105. In an embodiment, the input parser 225 may be configured for parsing/processing the user input 103 received from the user 101 and identify the pages to be printed and number of copies of each page to be printed. The page retrieval module 227 may be configured for retrieving the content/data of each of the pages selected for printing, from a digital document which is submitted by the user 101.

Figure 3B:
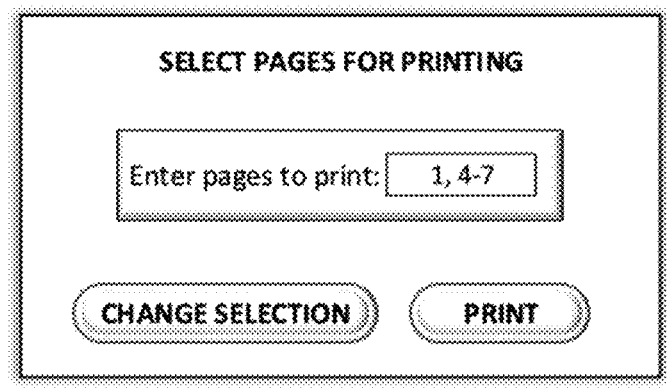
Figure 3C:
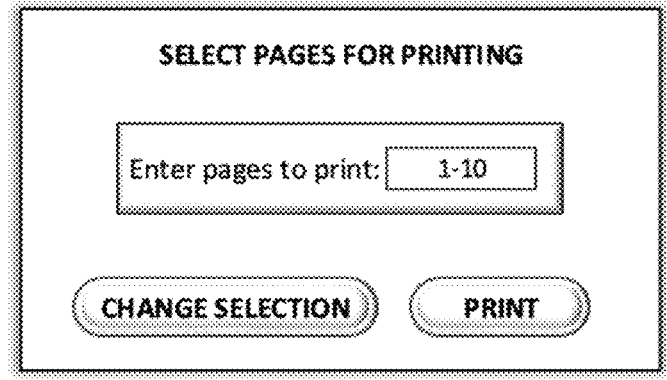

FIGS. 3A-3C provide exemplary illustration of a User Interface (UI) used for receiving user input 103 in accordance with some embodiments of the present disclosure.

FIG. 3A shows an exemplary UI provided to the user 101, using which the user 101 may enter the user input 103 to the printer driver unit 105. As shown in the UI, the user input 103 may be a string of numerals corresponding to pages of a document to be printed. For example, if a document comprises 10 pages and the user 101 intends to print three copies of page 1 and two copies of pages 4-7, then the user 101 may enter the string "1*3; 4-7*2" on the text field provided in the UI. In an embodiment, each page and the number of copies of each page may be separated by operators such as, without limitation, a comma (","), a semi-colon (";"), and the like, as per preferences of the user 101.

In an embodiment, after entering the user input 103, if the user 101 intends to modify the already entered user input 103, "CHANGE SELECTION" option may be chosen on the UI. Otherwise, the "PRINT" option may be used to send the user input 103 to the parser driver unit for further processing.

FIGS. 3B and 3C illustrate exemplary variations in the user input 103 entered by the user 101. As an example, when the user 101 intends to print only a single copy of all the selected pages, then the user 101 may simply enter the page numbers to be selected for printing as shown in FIG. 3B. That is, it may not be necessary to indicate the number of copies to be printed, when only a single copy of all the pages is to be printed. Similarly, when a single copy of all 10 pages of the document needs to be printed, the user 101 may simply enter the user input 103 as '1-10', as shown in FIG. 3C. Thus, the proposed method allows the user 101 to print variable copies of a plurality of pages in an easy and convenient manner.

Figure 4:
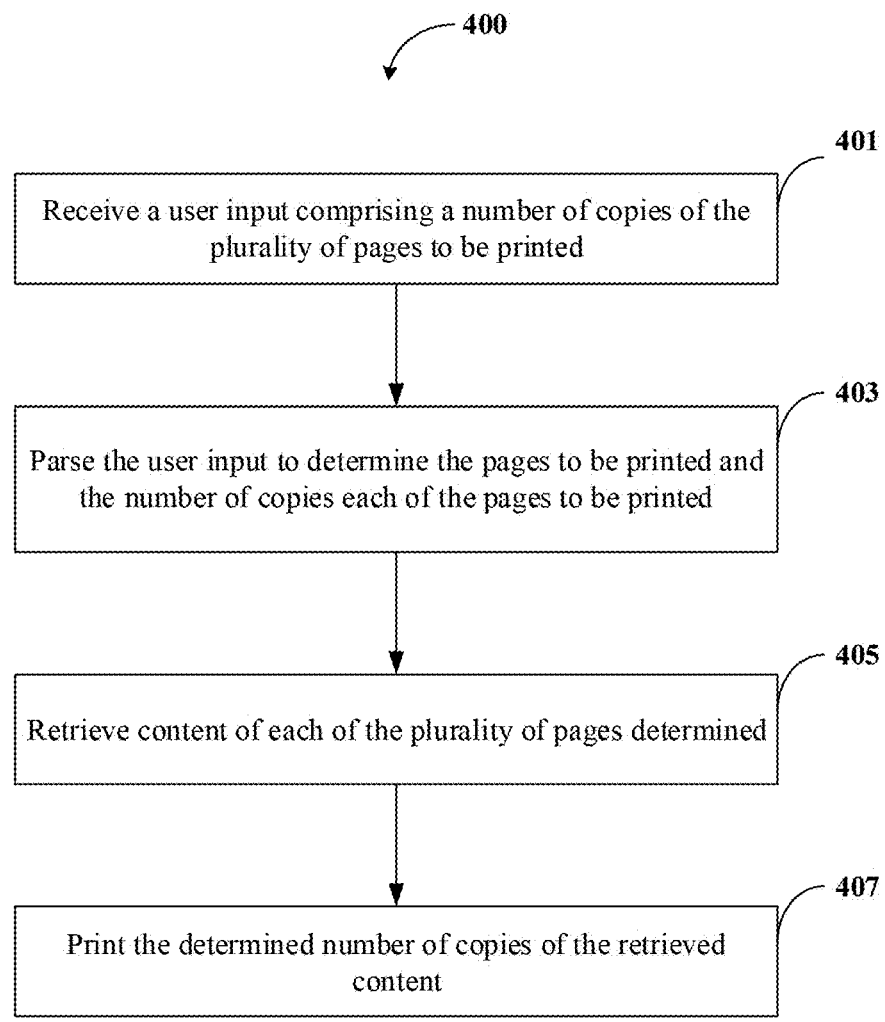
FIG. 4 shows a flowchart illustrating a method of printing variable copies of a plurality of pages of a document in accordance with some embodiments of the present disclosure.

FIG. 4 shows a flowchart illustrating a method of printing variable copies of a plurality of pages of a document in accordance with some embodiments of the present disclosure.

As illustrated in FIG. 4, a method 400 may include one or more blocks illustrating a method for printing variable copies of a plurality of pages from a document using a printer driver unit 105 illustrated in FIG. 1. The method 400 may be described in the general context of computer executable instructions. Generally, computer executable instructions can include routines, programs, objects, components, data structures, procedures, modules, and functions, which perform specific functions or implement specific abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, the method 400 includes receiving, by the printer driver unit 105, a user input 103 from a user 101 of a printer or a Multi-Function Printer (MFP) 107 associated with the printer driver unit 105. In an embodiment, the user input 103 may indicate a plurality of pages to be printed from the document and a number of copies that each of the plurality of pages to be printed. In an implementation, the user input 103 may be received through a driver UI 209 associated with the printer driver unit 105.

At block 403, the method 400 includes parsing, by the printer driver unit 105, the user input 103 to determine the plurality of pages to be printed and the number of copies each of the plurality of pages to be printed.

At block 405, the method 400 includes retrieving, by the printer driver unit 105, content of each of the plurality of pages determined from the user input 103 from a digital file and/or a storage of an external computer connected to the printer driver unit 105. After retrieval, the content of each of the plurality of pages may be temporarily stored in a memory of the printer driver unit 105.

At block 407, the method 400 includes printing, by the printer driver unit 105, the determined number of copies of the retrieved content. In an embodiment, printing the required number of copies may comprise transmitting, for a number of times equivalent to the determined number of copies, the stored content into a spooler associated with the printer driver unit 105 for printing.

Computer System

Figure 5:
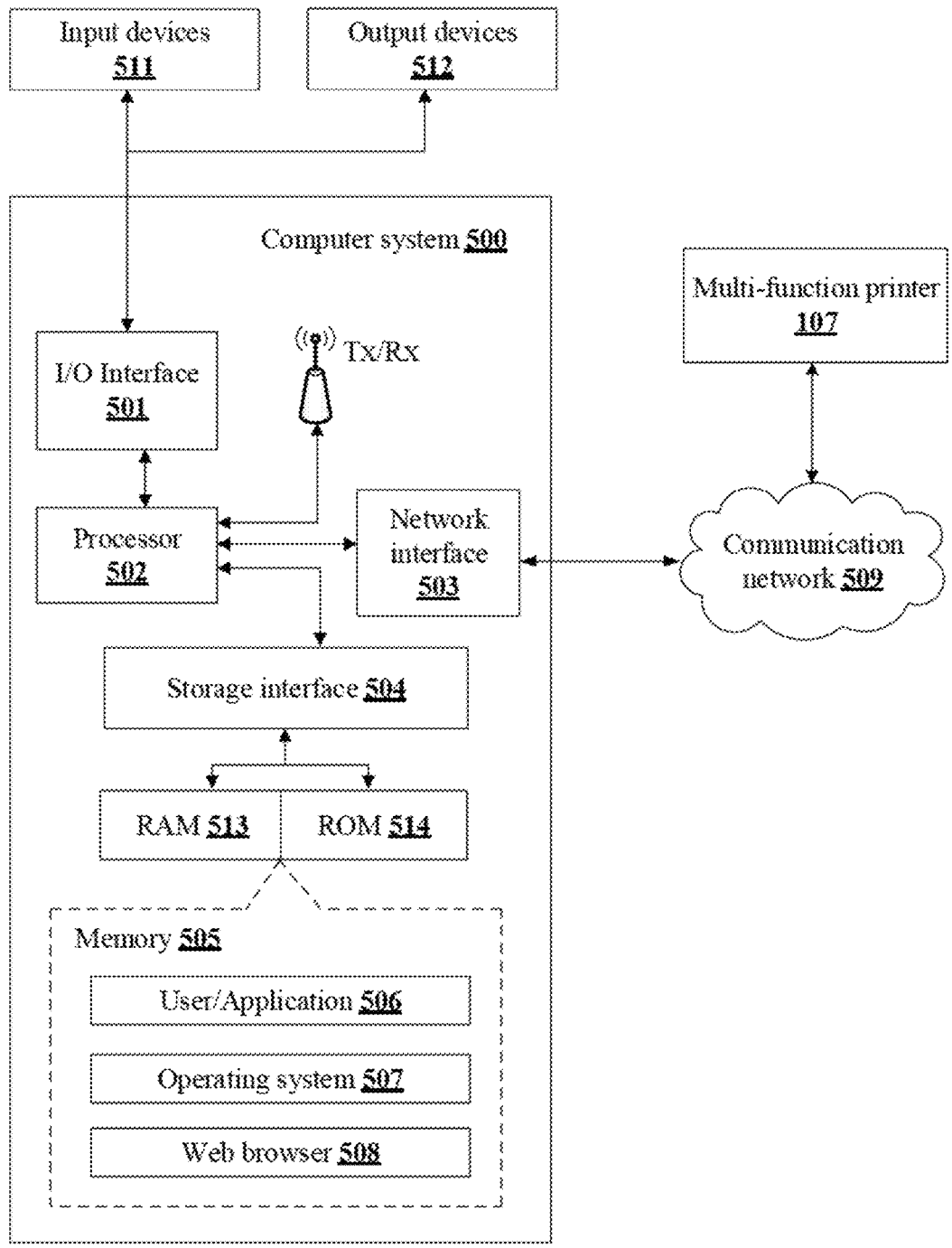
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be the printer driver unit 105 illustrated in FIG. 1, which may be used for printing variable copies of a plurality of pages from a document. In an alternative embodiment, the computer system may be a Multi-Function Printer (MFP) 107 configured with the printer driver unit 105. The computer system 500 may include a central processing unit ("CPU" or "processor") 502. The processor 502 may comprise at least one data processor for executing program components for executing user- or system-generated business processes. A user 101 may include any person, application or tool that directly or indirectly operates the computer system 500. The processor 502 may include specialized processing units such as integrated system (bus) controllers, memory management control units, floating point units, graphics processing units, digital signal processing units, etc.

The processor 502 may be disposed in communication with one or more Input/Output (I/O) devices (511 and 512) via I/O interface 501. The I/O interface 501 may employ communication protocols/methods such as, without limitation, audio, analog, digital, stereo, IEEE®-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE® 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 501, the computer system 500 may communicate with one or more I/O devices 511 and 512.

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc. Using the network interface 503 and the communication network 509, the computer system 500 may connect with the MFP 107 and/or any other computing device associated with the user 101 for receiving the user input 103 and/or for transmitting the content of pages selected for printing.

In an implementation, the communication network 509 may be implemented as one of the several types of networks, such as intranet or Local Area Network (LAN) and such within the organization. The communication network 509 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application interface 506, an operating system 507, a web browser 508, and the like. In some embodiments, computer system 500 may store user/application data 506, such as the data, variables, records, etc. as described in this invention. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

The user interface 506 may facilitate display, execution, interaction, manipulation, or operation of program components through textual or graphical facilities. For example, the user interface 506 may provide computer interaction interface elements on a display system operatively connected to the computer system 500, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 508 may be a hypertext viewing application. Secure web browsing may be provided using Secure Hypertext Transport Protocol (HTTPS), Secure Sockets Layer (SSL), Transport Layer Security (TLS), and the like. The web browsers 508 may utilize facilities such as AJAX, DHTML, ADOBE® FLASH®, JAVASCRIPT®, JAVA®, Application Programming Interfaces (APIs), and the like. Further, the computer system 500 may implement a mail server stored program component. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiments of the present disclosure are illustrated herein.

In an embodiment, the present disclosure provides a method and/or mechanism that allows users to print different number of copies of a plurality of selected pages on a 'single' print action.

In an embodiment, by allowing printing of variable copies of the pages in a single 'print' action, the present disclosure ensures that the users need not issue multiple/repetitive print commands. This, in turn, helps in enhancing speed of printing. Also, since the number of print commands is reduced, the present disclosure ensures optimal usage of resources (such a printer time, electricity etc.).

In an embodiment, the present disclosure enhances overall user experience with printing, since the users are allowed to customize the number of copies that the multiple pages are required to be printed.

In light of the technical advancements provided by the disclosed method and the printer driver unit, the claimed steps, as discussed above, are not routine, conventional, or well-known aspects in the art, as the claimed steps provide the aforesaid solutions to the technical problems existing in the conventional technologies. Further, the claimed steps clearly bring an improvement in the functioning of the MFPs, printers and/or other related devices, as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device/article is described herein (whether they cooperate), it will be clear that a single device/article may be used in place of the more than one device/article or a different number of devices/articles may be used instead of the shown number of devices or programs. The functionality and/or features of a device may be alternatively embodied by one or more other devices which are not explicitly described as having such functionality/features. Thus, other embodiments of invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on.

Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | User |
| 103 | User input |
| 105 | Printer driver unit |
| 107 | Multi-Function Printer (MFP) |

-continued

| Reference Number | Description |
| --- | --- |
| 109 | Printed pages |
| 201 | Printer application |
| 203 | Graphics Device Interface |
| 205 | Processor |
| 207 | Memory |
| 209 | Driver User Interface |
| 211 | Print spooler |
| 213 | Printing unit |
| 215 | Data |
| 217 | Temporary file |
| 219 | Other data |
| 221 | Modules |
| 223 | Receiving module |
| 225 | Input parser |
| 227 | Page retrieval module |
| 229 | Other modules |
| 500 | Exemplary computer system |
| 501 | I/O Interface of the exemplary computer system |
| 502 | Processor of the exemplary computer system |
| 503 | Network interface |
| 504 | Storage interface |
| 505 | Memory of the exemplary computer system |
| 506 | User/Application |
| 507 | Operating system |
| 508 | Web browser |
| 509 | Communication network |
| 511 | Input devices |
| 512 | Output devices |
| 513 | RAM |
| 514 | ROM |

What is claimed is:

1. A method for printing variable copies of a plurality of pages of a single document, the method comprising:
providing a user interface that facilitates receiving a user input for selecting which of the plurality of pages of the single document are to be printed and a number of copies for each of the plurality of pages of the single document to be printed, wherein the user interface includes a single entry box that receives a string of numerals that identifies which of the plurality of pages of the single document are to be printed and the number of copies for each of the plurality of pages of the single document to be printed;
receiving, by a printer driver, the user input comprising the number of copies for each of the plurality of pages of the single document to be printed;
analyzing, by the printer driver, the user input to determine the plurality of pages to be printed and the number of copies for each of the plurality of pages to be printed;
retrieving, by the printer driver, content of each of the plurality of pages to be printed; and
printing, by the printer driver, the number of copies of the content.

2. The method of claim 1, wherein the printer driver is configured in a printer.

3. The method of claim 1, wherein the user interface is associated with the printer driver.

4. The method of claim 1, wherein the printing further comprises:
storing the content of each of the plurality of pages determined in a temporary file associated with a printer; and
transmitting, for a number of times equivalent to the determined number of copies, the content stored in the temporary file for printing.

5. A method for printing a variable number of copies of pages in a document, the method comprising:

receiving, by one or more processors, a user command including (i) a first page subset selection identifying (a) one or more first pages of the document and (b) a first number of copies of the one or more first pages to be printed and (ii) a second page subset selection identifying (a) one or more second pages of the document different than the one or more first pages and (b) a second number of copies of the one or more second pages to be printed, wherein the user command includes a string of numerals, and wherein the string of numerals includes (i) a first page range representing the one or more first pages modified by a first number representing the first number of copies and (ii) a second page range representing the one or more second pages modified by a second number representing the second number of copies;

acquiring, by the one or more processors, content regarding the one or more first pages and the one or more second pages of the document; and instructing, by the one or more processors, a printer to print the content such that the first number of copies of the one or more first pages of the document are printed and the second number of copies of the one or more second pages of the document are printed in a single printing process in response to the user command.

6. The method of claim 5, wherein the one or more processors are part of the printer.

7. The method of claim 5, wherein the one or more processors are part of a computing device external from the printer.

8. The method of claim 5, wherein the one or more processors include at least one processor in the computing device and at least one other processor in the printer.

9. A printer driver comprising:

a processor; and a memory communicatively coupled to the processor, wherein the memory is configured to store processor-executable instructions, which on execution, cause the processor to:

receive a user command including (i) a first page subset selection of pages from a single document identifying (a) one or more first pages of the single document and (b) a first number of copies of the one or more first pages to be printed and (ii) a second page subset selection of the pages from the single document identifying (a) one or more second pages of the single document different than the one or more first pages and (b) a second number of copies of the one or more second pages to be printed;

acquire content regarding the one or more first pages and the one or more second pages of the document; and instruct printing of the content such that the first number of copies of the one or more first pages of the single document are printed and the second number of copies of the one or more second pages of the single document are printed in a single printing process in response to the user command.

10. The printer driver of claim 9, wherein the printer driver is configured in a printer.

11. The printer driver of claim 9, further comprising a user interface for receiving the user command.

12. The printer driver of claim 9, wherein the user command is a string of numerals.

13. The printer driver of claim 12, wherein the string of numerals includes (i) a first page range representing the one or more first pages modified by a first number representing the first number of copies and (ii) a second page range representing the one or more second pages modified by a second number representing the second number of copies.

14. The printer driver of claim 9, wherein the memory is further configured to store processor-executable instructions, which on execution, cause the processor to:

store the content in a temporary file associated with a printer; and transmit the content associated with the one or more first pages and the one or more second pages stored in the temporary to the printer for a number of times equivalent to the first number of copies and the second number of copies, respectively.

* * * * *